(12) United States Patent
Laventman et al.

(10) Patent No.: US 11,061,984 B2
(45) Date of Patent: *Jul. 13, 2021

(54) GRID-BASED GEOFENCE DATA INDEXING

(71) Applicant: International Business Machines Corporation, Armonk, NY (US)

(72) Inventors: Gennady Laventman, Haifa (IL); Roie Melamed, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 371 days.

This patent is subject to a terminal disclaimer.

(21) Appl. No.: 16/239,764

(22) Filed: Jan. 4, 2019

(65) Prior Publication Data

US 2019/0155865 A1 May 23, 2019

Related U.S. Application Data (63) Continuation of application No. 15/650,058, filed on Jul. 14, 2017, now Pat. No. 10,242,116, which is a continuation of application No. 14/938,978, filed on Nov. 12, 2015, now Pat. No. 9,747,380.

(51) Int. Cl.
| | | |
|---|---|---|
| *G06F 16/9537* | (2019.01) | |
| *H04W 4/021* | (2018.01) | |
| *H04W 4/12* | (2009.01) | |
| *G06F 16/29* | (2019.01) | |
| *G06F 16/22* | (2019.01) | |

(52) U.S. Cl.
CPC ...... *G06F 16/9537* (2019.01); *G06F 16/2255* (2019.01); *G06F 16/29* (2019.01); *H04W 4/021* (2013.01); *H04W 4/12* (2013.01)

(58) Field of Classification Search
CPC .. G06F 16/9537; G06F 16/29; G06F 16/2255; H04W 4/021; H04W 4/12
USPC .......................................................... 701/522
See application file for complete search history.

(56) References Cited

U.S. PATENT DOCUMENTS

| | | |
|---|---|---|
| 8,046,168 B2 | 10/2011 | Wang et al. |
| 8,750,895 B2 | 6/2014 | Grosman et al. |
| 8,909,256 B2 | 12/2014 | Fraccaroli |
| 9,747,380 B2 | 8/2017 | Laventman et al. |
| 2012/0309413 A1 | 12/2012 | Grosman et al. |

(Continued)

FOREIGN PATENT DOCUMENTS

DE 112012002346 T5 2/2014

OTHER PUBLICATIONS

Cirillo, et al., "Large Scale Indexing of Geofences", 2014 Fifth International Conference on Computing for Geospatial Research and Application. pp. 1-8. DOI 10.1109/COM.Geo.2014.13 © 2014 IEEE.

(Continued)

*Primary Examiner* — Maceeh Anwari
(74) *Attorney, Agent, or Firm* — Stosch Sabo (57) ABSTRACT

One or more location updates from one or more user devices can be associated with one or more grid elements dividing a geographic area. Each location update corresponding to a set of user device data can be stored in a hashtable according to grid element. The hashtable can be resized based on the number of grid elements containing one or more sets of user device data. A set of grid elements can be determined to overlap a geofence, and zero or more sets of user device data can be retrieved from the hashtable corresponding to zero or more user devices located within the geofence.

15 Claims, 6 Drawing Sheets

(56) References Cited

U.S. PATENT DOCUMENTS

2017/0139934 A1    5/2017   Laventman et al.
2017/0316015 A1    11/2017  Laventman et al.

OTHER PUBLICATIONS

Gonzalez, et al., "Google Fusion Tables: Data Management, Integration and Collaboration in the Cloud", SoCC'10, Jun. 10-11, 2010, Indianapolis, Indiana, USA. 6 pages. Copyright 2010 ACM 978-1-4503-0036-0/10/06.

Mon, et al., "Location-Based R-Tree and Grid-Index for Nearest Neighbor Query Processing", Proceedings of 2015 International Conference on Future Computational Technologies (ICFCT'2015). Singapore, Mar. 29-30, 2015, pp. 136-142.

Zhuang, et al., "A Method and System for a High Performance Quad-Tree based User-Location related Spatial Index Algorithm and its Applications", An IP.com Prior Art Database Technical Disclosure. IP.com No. 000225644. pp. 1-5.

IBM, List of IBM Patents or Patent Applications Treated as Related, Jan. 3, 2019, 2 pages.

GRID-BASED GEOFENCE DATA INDEXING

BACKGROUND

The present disclosure relates to geofences, and more specifically, to indexing, storing, and retrieving geofence data and device/user locations.

SUMMARY

Aspects of the present disclosure relate to analyzing geofence data. In some embodiments, the present disclosure includes a method comprising dividing a geographic area into a plurality of grid elements. The method can further comprise associating one or more respective location updates from one or more respective user devices located within the geographic area to a respective grid element to create one or more non-empty grid elements. The method can further comprise creating a hashtable storing each non-empty grid element, where each non-empty grid element comprises a respective set of user device data for each respective user device located in each respective non-empty grid element. The method can further comprise resizing the hashtable based on a total number of non-empty grid elements. The method can further comprise determining at least one non-empty grid element from the one or more non-empty grid elements which at least partially overlaps a geofence, where the geofence comprises an area overlapping the geographic area. The method can further comprise retrieving, from the hashtable, each respective set of user device data associated with each respective user device located in the geofence.

Additional embodiments of the present disclosure relate to a system comprising a memory storing a geographic area, one or more geofence areas intersecting at least a portion of the geographic area, and one or more sets of user device data. Each respective set of user device data can comprise at least a respective location of each respective user device. The system can further comprise a processor communicatively coupled to the memory and configured to compile user device location data and to identify user devices operating in the one or more geofence areas. In order to compile user device location data, the processor can be further configured to divide the geographic area into a plurality of grid elements. The processor can be further configured to associate each respective set of user device data to a respective grid element based on a respective location of each respective user device, where each respective grid element associated with one or more sets of user device data comprises a non-empty grid element. The processor can be further configured to create a hashtable storing each respective set of user device data and organized by non-empty grid element. The processor can be further configured to resize the hashtable based on a number of non-empty grid elements. To identify user devices operating in the one or more geofence areas, the processor can be further configured to retrieve a respective geofence area from the memory and determine one or more non-empty grid elements intersecting, in whole or in part, the respective geofence area. The processor can be further configured to retrieve, from the hashtable and based on the one or more non-empty grid elements intersecting the respective geofence area, a set of user device data associated with each respective user device located in the respective geofence area.

Further embodiments of the present disclosure relate to a computer program product comprising a computer readable storage medium having program instructions embodied therewith. The program instructions can be executed by a processor to cause the processor to divide a geographic area into a plurality of grid elements. The program instructions can further cause the processor to associate one or more respective location updates from one or more respective user devices to a respective grid element to create one or more populated grid elements having at least one user device operating therein. The program instructions can further cause the processor to create a hashtable comprising a plurality of keys, where at least one key is associated with one or more respective sets of user device data corresponding to each respective populated grid element. The program instructions can further cause the processor to resize the hashtable based on the one or more populated grid elements and determine an intersection between a geofence and one or more populated grid elements, where the geofence can comprise a portion of the geographic area. The program instructions can further cause the processor to retrieve, based on determining an intersection between the geofence and the one or more populated grid elements, one or more respective sets of user device data from the hashtable corresponding to the one or more respective populated grid elements intersecting the geofence, where the one or more respective sets of user device data can correspond to one or more respective user devices located in the geofence.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to geofences. More particular aspects relate to storing and retrieving geofence data. Although not limited to such applications, an understanding of some embodiments of the present disclosure may be improved given the context of storing and retrieving geofence data.

As is understood by one of skill in the art, geofences can use the global positioning system (GPS), radio frequency identification (RFID), WIFI positioning platform, or iBeacon sensors to virtually define and monitor geographical areas. A geofence (also referred to as a geofence area herein) can be associated with triggers notifying a user and/or an administrator when a user device (e.g., a mobile phone) enters or exits (or dwells within) a geofence. In various embodiments, a message can be sent to a user device in response to a trigger associated with the location of the user device. The message can comprise a text message, an email, an alert associated with an application operating on the user device, or a different type of message.

A geofence can comprise a volume of space. In some cases, a geofence is defined as an area rather than a volume, though there is nonetheless a volume associated with the area (e.g., a geofence could be defined as one square mile, although in actuality, the geofence could be associated with an unstated height of 500 feet to create a volume).

One type of geofence comprises a point and a radius to define a circular geofence. Although circular geofences will be described in this disclosure in accordance with some embodiments of the present disclosure, it is to be understood that geofence areas can comprise geometric shapes other than circles. Thus, circular geofence areas should be construed as example geofences and should not be construed as limiting to the present disclosure.

Aspects of the present disclosure can define a monitored geographic area using a grid. Each grid element (i.e., cell) of the grid can include zero or more user devices operating therein. A grid element having one or more user devices operating therein comprises a non-empty grid element (also referred to as a populated grid element herein). A grid element having zero user devices operating therein comprises an empty grid element. The user device data contained in the non-empty grid elements can be compiled in a hashtable in a plurality of keys (also referred to as buckets herein). In some embodiments, the hashtable can resize to include a number of keys approaching the number of non-empty grid elements.

Aspects of the present disclosure can identify zero or more user devices located in one or more geofences. A respective geofence can comprise a geographic area partially or fully contained in the monitored geographic area. A set of non-empty grid elements can be determined to overlap, in whole or in part, with a geometry of the respective geofence. The user device data corresponding to the user devices located in the respective geofence can be retrieved from the hashtable according to the set of non-empty grid elements overlapping, in whole or in part, the geometry of the respective geofence.

Thus, some aspects of the present disclosure enable efficient comparison of user device locations with geofence locations. Numerous location updates (e.g., hundreds of thousands) can be received each second and can be compared to numerous geofences (e.g., millions) to determine one or more user devices located in one or more geofence areas. Aspects of the present disclosure can expedite this comparison by using statically indexed geographies allocated to a one-dimensional hashtable. Statically indexed geographies can result in constant time complexity for queries executed thereon. One-dimensional hashtables compiling the non-empty portions of the statically indexed geography can result in high memory utilization, low search complexity, and low update complexity. Thus, aspects of the present disclosure can compile and analyze geofence data more efficiently and/or expeditiously than alternative strategies, such as, for example, strategies employing spatial trees (e.g., R-trees, Quad-trees, and KD-Trees).

Figure 1:
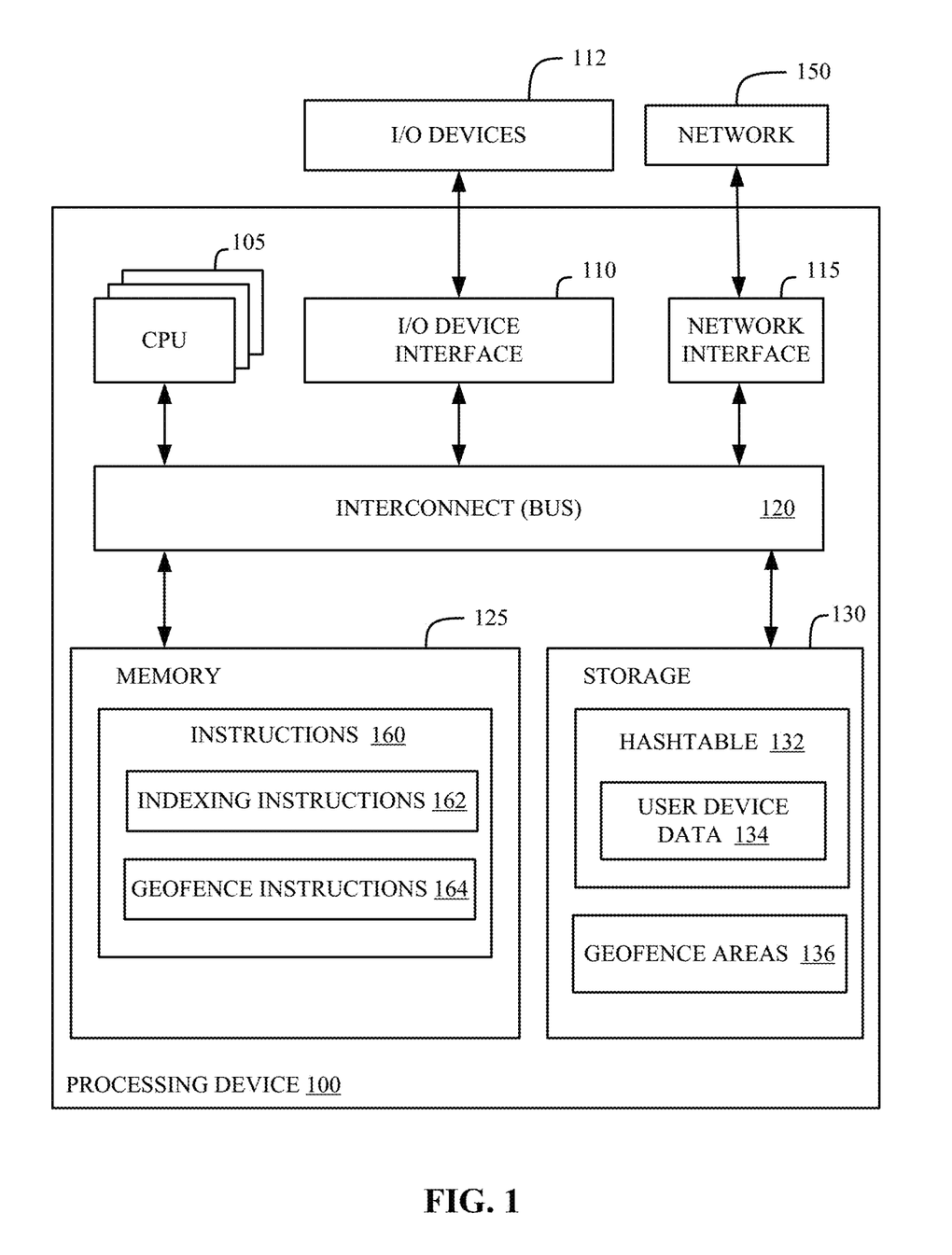
FIG. 1 illustrates a block diagram of a processing device in accordance with some embodiments of the present disclosure.

Referring now to the figures, FIG. 1 illustrates a block diagram of a processing device in accordance with some embodiments of the present disclosure. In various embodiments, the processing device 100 includes a memory 125, storage 130, an interconnect (e.g., BUS) 120, one or more processors (e.g., CPUs) 105, an I/O device interface 110, I/O devices 112, and a network interface 115.

Each processor 105 can be communicatively coupled to the memory 125 or storage 130. Each processor 105 can retrieve and execute programming instructions stored in the memory 125 or storage 130. In some embodiments, each processor 105 can execute methods as shown and described hereinafter with reference to FIGS. 2, 4, and 6. The interconnect 120 is used to move data, such as programming instructions, between the CPU 105, I/O device interface 110, storage 130, network interface 115, and memory 125. The interconnect 120 can be implemented using one or more busses. The processors 105 can be a single CPU, multiple CPUs, or a single CPU having multiple processing cores in various embodiments. In some embodiments, a processor 105 can be a digital signal processor (DSP). Memory 125 is generally included to be representative of a random access memory (e.g., static random access memory (SRAM), dynamic random access memory (DRAM), or Flash). The storage 130 is generally included to be representative of a non-volatile memory, such as a hard disk drive, solid state device (SSD), removable memory cards, optical storage, or flash memory devices. In an alternative embodiment, the storage 130 can be replaced by storage area-network (SAN) devices, the cloud, or other devices connected to the processing device 100 via the I/O device interface 110 or a communication network 150 via the network interface 115.

The network 150 can be implemented by any number of any suitable communications media (e.g., wide area network (WAN), local area network (LAN), Internet, Intranet, etc.). In certain embodiments, the network 150 can be implemented within a cloud computing environment or using one or more cloud computing services. In some embodiments, the network interface 115 communicates with both physical and virtual networks.

The processing device 100 and the I/O devices 112 can be local to each other, and communicate via any appropriate local communication medium (e.g., local area network (LAN), hardwire, wireless link, Intranet, etc.) or they can be physically separated and communicate over a virtual network. In some embodiments, the I/O devices 112 can include a display unit capable of presenting information (e.g., a geographic grid having zero or more geofences and zero or more user device locations) to a user and receiving one or more inputs (e.g., a geofence definition) from a user.

In some embodiments, the memory 125 stores instructions 160 while the storage 130 stores a hashtable 132 and geofence areas 136. However, in various embodiments, the instructions 160, hashtable 132, and geofence areas 136 are stored partially in memory 125 and partially in storage 130, or they are stored entirely in memory 125 or entirely in storage 130, or they are accessed over a network 150 via the network interface 115.

The instructions 160 can store processor executable instructions for various methods such as the methods shown and described hereinafter with respect to FIGS. 2, 4, and 6. The instructions 160 can contain indexing instructions 162 which can provide instructions suitable to cause a processor to divide a geographic area into a plurality of grid elements, associate user device data 134 with respective grid elements, and populate a hashtable 132 with the user device data 134 associated with the respective grid elements. User device data 134 can include, but is not limited to, data such as current and historical location data, user data, and contact data. Instructions 160 can further include geofence instructions 164 which can determine a set of user devices overlapping one or more geofence areas 136 and retrieve a set of user device data 134 associated with said user devices from the hashtable 132.

Figure 2:
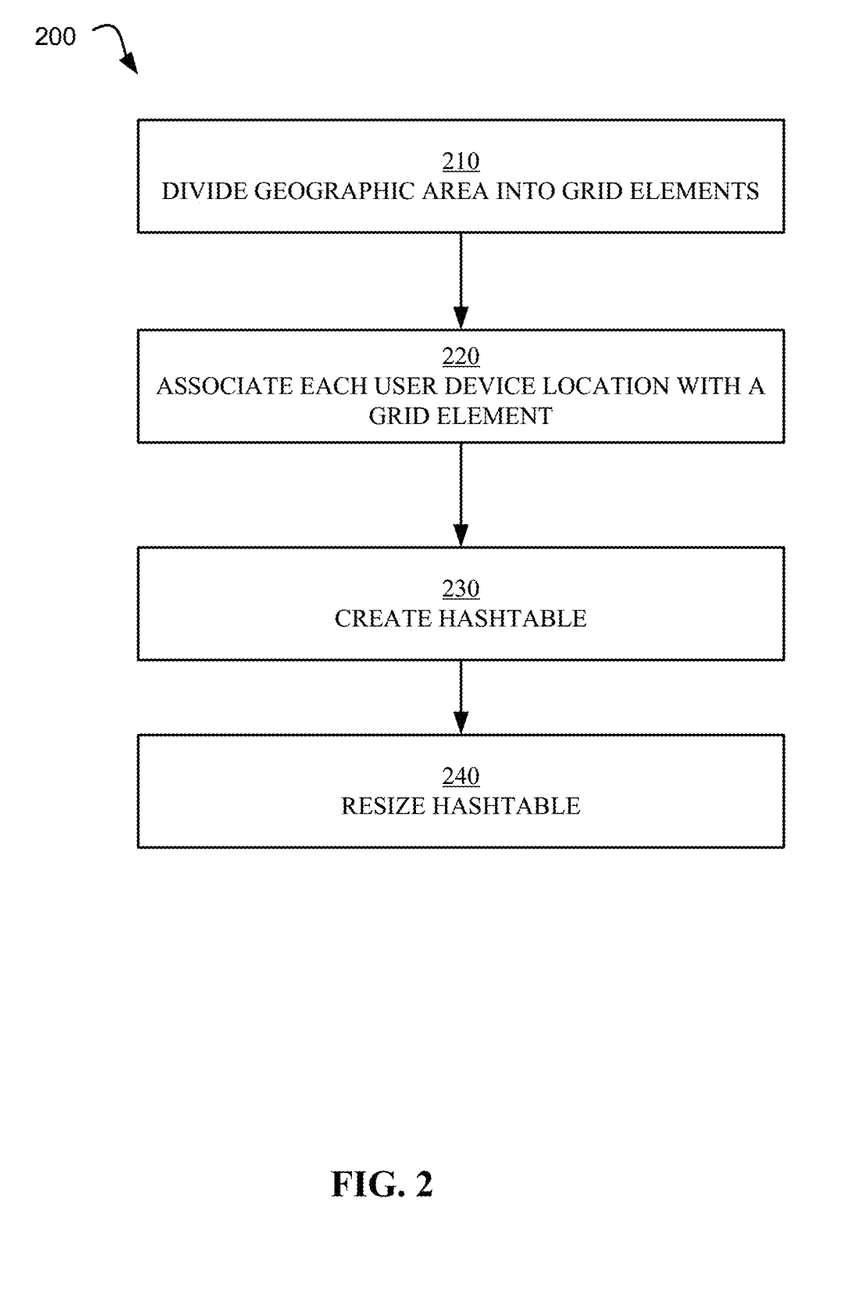
FIG. 2 illustrates a flowchart of a method for indexing geofence data in accordance with some embodiments of the present disclosure.

Referring now to FIG. 2, illustrated is a flowchart of a method for indexing geofence data according to some embodiments of the present disclosure. The method 200 can be executed by one or more processors (e.g., processors 105 of FIG. 1) executing a set of instructions (e.g., instructions 160 of FIG. 1).

The method 200 can begin by dividing a geographic area into a set of grid elements in operation 210. The grid elements can comprise any number of similar or dissimilar geometries suitable for segmenting a geographic area. In some embodiments, the grid elements comprise squares (e.g., 100 meters long by 100 meters wide) or rectangles. The grid elements can be similarly sized according to some embodiments of the present disclosure. In some embodiments, the grid elements are enumerated. For example, a set of grid elements can be enumerated from 0 to N−1 where N represents the total number of grid elements. In such an example, the grid element corresponding to 0 can be located in a bottom left portion of the geographic area and the grid element corresponding to N−1 can be located in an upper right portion of the geographic area.

In operation 220, a plurality of user devices (e.g., mobile phones) can be associated with the plurality of grid elements according to a respective location of each user device. Operation 220 can thus define both empty grid elements (i.e., grid elements having zero user devices/geofences located therein) and non-empty grid elements (i.e., grid elements having one or more user devices/geofences located therein).

In some embodiments, the grid element size and geometry can be based on a maximum number of users in any one grid element of the plurality of grid elements, a minimum number of users in any one grid element of the plurality of grid elements, an average number of users in each grid element based on the plurality of grid elements, or other parameters.

In operation 230, a hashtable can be created based on the user devices located in the non-empty grid elements. In various embodiments, the hashtable can initially contain a number of keys (i.e., buckets) corresponding to a square root of the number of grid elements in the geographic grid. In cases where the square root of the number of grid elements is not an integer, the square root can be rounded to the nearest integer, rounded to the next larger integer, or rounded to the next smaller integer. In various embodiments, each respective key of the hashtable created in operation 230 can store zero, one, or more than one non-empty grid element and a set of user device data corresponding to each respective non-empty grid element. Respective sets of user device data can include, but are not limited to, current and historical location data, user data, and contact data.

In operation 240, the hashtable can be resized. The hashtable can be resized such that the number of keys associated with the hashtable approaches the number of non-empty grid elements. Thus, the hashtable can have a maximal number of keys equal to the plurality of grid elements created in operation 210. In some cases, the number of keys associated with the hashtable is equal to the number of non-empty grid elements. Some keys can nonetheless contain zero non-empty grid elements and some keys can contain more than one non-empty grid element following operation 240.

Thus, as shown and described with respect to the method 200, aspects of the present disclosure can index a set of user device locations by grid element in a hashtable. Advantageously, in embodiments where the grid elements are consistently sized, a search identifying user devices located in a given geographic area can result in low and constant processing time complexity. Furthermore, indexing the non-empty grid elements into a hashtable and resizing the hashtable according to the number of non-empty grid elements further increases the efficiency of operations associated with querying user device location data.

Figure 3:
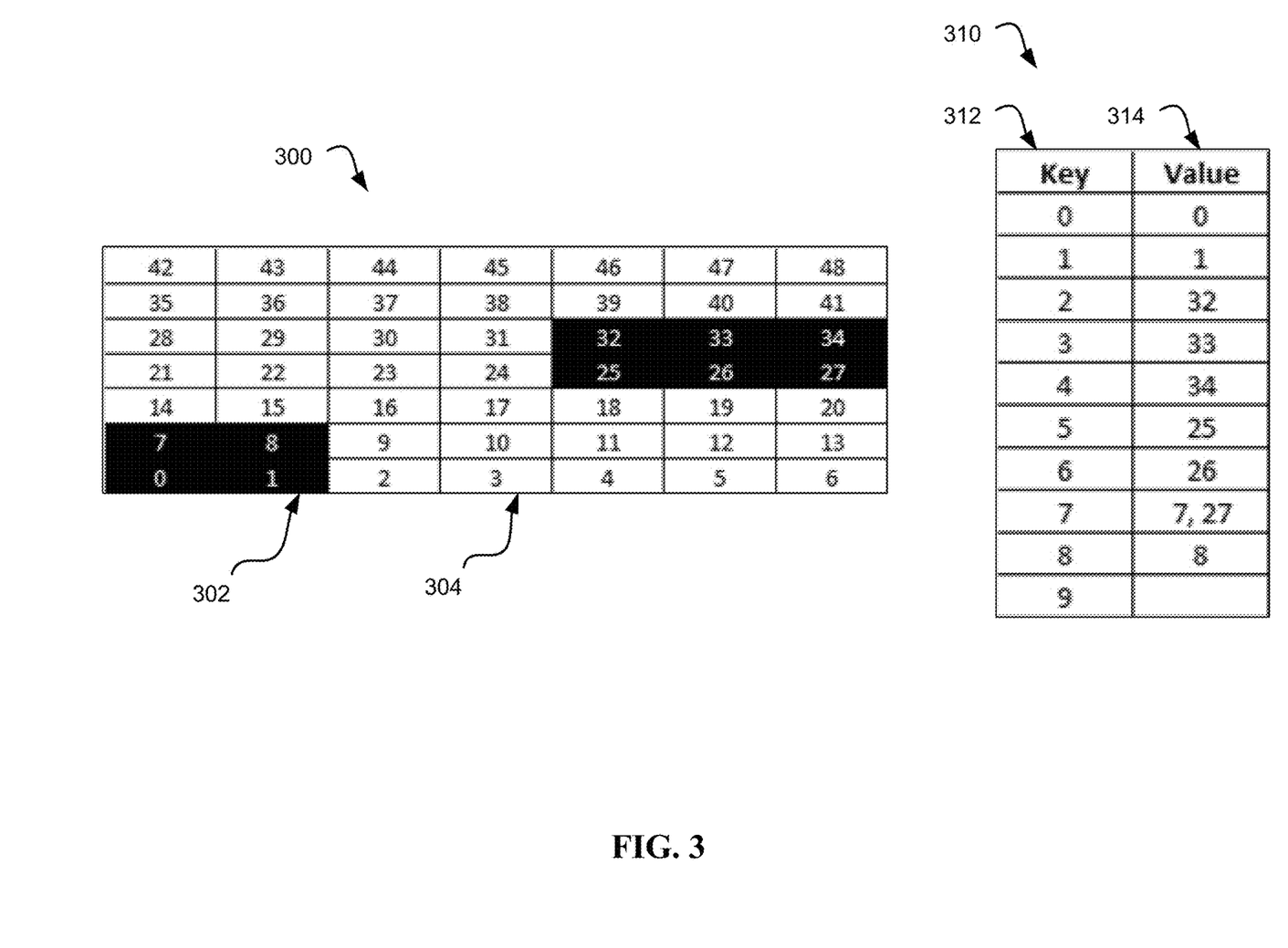
FIG. 3 illustrates an example geographic grid and a corresponding hashtable in accordance with some embodiments of the present disclosure.

Referring now to FIG. 3, illustrated is an example geographic grid and a corresponding hashtable in accordance with some embodiments of the present disclosure. The geographic grid 300 and the hashtable 310 can be created and updated by one or more processors (e.g., processors 105 of FIG. 1) executing a set of instructions (e.g., indexing instructions 162 of FIG. 1). The hashtable can be stored in a memory (e.g., storage 130 storing hashtable 132 of FIG. 1).

The example geographic grid 300 comprises 49 grid elements numbered from 0 (in the bottom left portion) to 48 (in the top right portion). Shaded grid elements 302 can correspond to non-empty grid elements. Non-empty grid elements contain one or more user devices located therein. Thus, according to the geographic grid 300, non-empty grid elements are grid elements 0, 1, 7, 8, 25, 26, 27, 32, 33, and 34. Non-shaded grid elements 304 can correspond to empty grid elements having no user devices located therein. Various aspects of the present disclosure include rectangular, square, or other grid element geometries having static or variable dimensions associated with a respective geographic grid 300.

The hashtable 310 can comprise a set of keys 312 corresponding to zero or more values 314. Ten keys are listed in hashtable 310 numbered from 0 to 9. Values 314 corresponding to each key represent non-empty grid elements 302. Thus, each key corresponding to one or more non-empty grid elements catalogs the one or more user devices associated with the corresponding one or more non-empty grid elements.

The hashtable can resize the number of keys comprising the hashtable such that the number of keys can correspond to the number of non-empty grid elements 302. Thus, there are ten keys 312 in hashtable 310 corresponding to the ten non-empty grid elements 302 in the geographic grid 300. If there were more non-empty grid elements (e.g., 20 instead of 10), then the hashtable can resize to average one non-empty grid element per key, resulting in twenty keys. The hashtable 310, as shown, has been resized (e.g., resized in accordance with operation 240 of FIG. 2). According to some embodiments, the hashtable 310 is initially created having a number of keys equal to a square root of the number of grid elements. Thus, according to the geographic grid 300, the hashtable 310, in its initial form, can contain seven keys (corresponding to the square root of 49 which is the total number of grid elements in geographic area 300). Upon identifying the ten non-empty grid elements, the hashtable can resize to contain ten keys as shown in hashtable 310.

More than one non-empty grid element can be associated with a respective key. For example, key 7 catalogs user device data associated with both non-empty grid elements 7 and 27. Likewise, in some embodiments, zero non-empty grid elements can be associated with a respective key. For example, key 9 is associated with zero non-empty grid elements 302.

Thus, FIG. 3 illustrates an example geographic grid 300 and an example hashtable 310. In various embodiments, the geographic grid 300 can contain fewer or more grid elements, and, likewise, the hashtable 310 can contain fewer or more keys. Advantageously, FIG. 3 presents an example indexed hashtable 310 capable of efficiently storing and querying user device locations corresponding to one or more grid elements.

Figure 4:
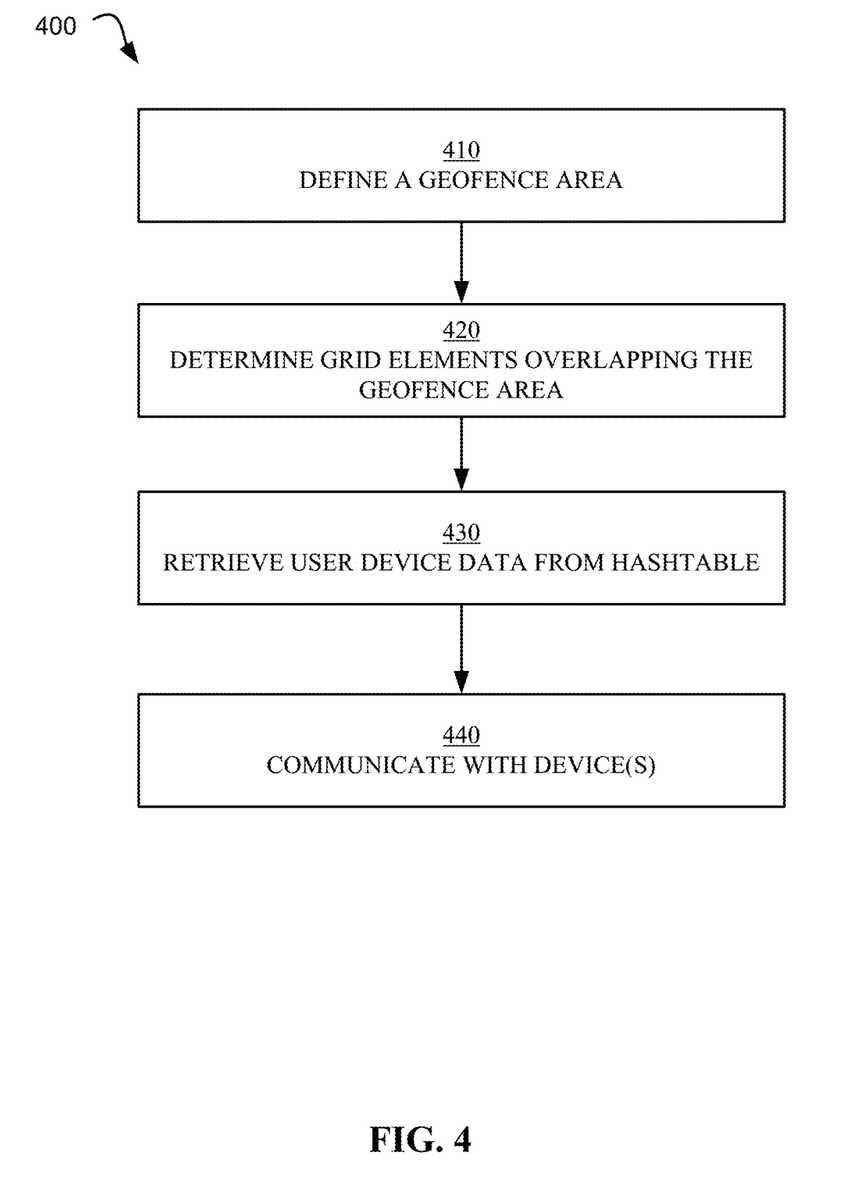
FIG. 4 illustrates a flowchart of a method for determining users in a geofence in accordance with some embodiments of the present disclosure.

Referring now to FIG. 4, illustrated is a flowchart of a method for identifying a set of user devices located in a geofence area in accordance with some embodiments of the present disclosure. The method 400 can be executed by one or more processors (e.g., processors 105 of FIG. 1) according to a set of instructions (e.g., geofence instructions 164 of FIG. 1).

The method 400 can begin by defining a geofence area in operation 410. In operation 410, a new geofence can be defined, or data regarding an existing geofence can be retrieved. A new geofence can be defined by selecting a geographic area to be associated with the geofence. In some cases, the geographic area can comprise a circular area defined by a point (i.e., center) and a radius. In alternative cases, the geographic area can comprise a square, a rectangle, or a different geometry.

Operation 420 can determine a set of non-empty grid elements that overlap the geofence area defined in operation 410. The overlap can comprise an intersection between the geofence area and at least a portion of at least one grid element. Thus, operation 420 can identify a set of non-empty grid elements which entirely overlap the geofence area and a set of non-empty grid elements which partially overlap the geofence area. In cases where a non-empty grid element partially overlaps a geofence area, a condition can be constructed to define a portion of the non-empty grid element overlapping the geofence area. For example, in the case of a circular geofence area having a center (X, Y) and a radius measuring length R, then a set of permissible locations within a non-empty grid element partially overlapping the circular geofence could satisfy the condition: for each point (A, B) in said grid element: true if distance from (X, Y) to (A, B) is less than R.

Operation 430 can retrieve user device data associated with user devices located in a respective geofence from the hashtable. Operation 430 can retrieve all user device data from each non-empty grid element entirely overlapping the geofence area and zero or more sets of user device data from non-empty grid elements partially overlapping the geofence area via, for example, a network (e.g., network 150 of FIG. 1).

Operation 440 can communicate with one or more devices. In some embodiments, the retrieved data is output to a user interface (e.g., I/O devices 112 of FIG. 1). The user interface can be viewed by, for example, an administrator. Operation 440 can also communicate with the user devices determined to be located within the geofence area. For example, operation 440 can comprise sending one or more messages to each user device. The one or more messages can comprise, for example, a text message, an email, a voice message, or a different message.

Thus, the method 400 illustrates a method for identifying user devices located in a geofence. The method 400 can identify relevant non-empty grid elements, or portions thereof, overlapping the geofence area. The method 400 can further retrieve user device data from said relevant non-empty grid elements, or portions thereof, using a hashtable query.

Figure 5:
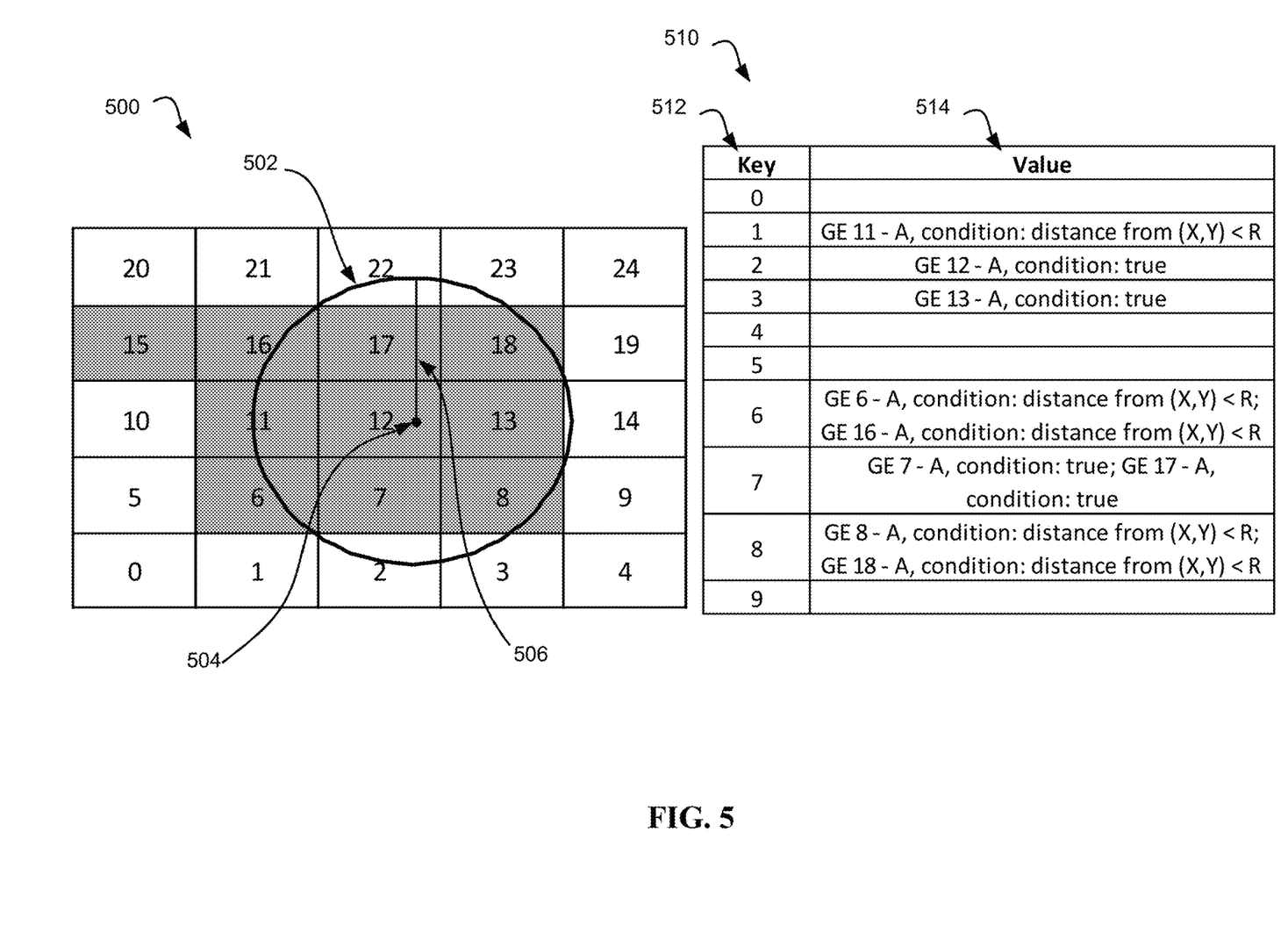
FIG. 5 illustrates an example query in accordance with some embodiments of the present disclosure.

Referring now to FIG. 5, illustrated is an example geofence query in accordance with some embodiments of the present disclosure. FIG. 5 illustrates a geographic area 500 having a geofence 502 and a hashtable 510 corresponding to the geofence 502. The geographic area 500 can comprise twenty-five grid elements numbered 0-24 as shown. The geographic area 500 can include ten shaded, non-empty grid elements (i.e., non-empty grid elements 6, 7, 8, 11, 12, 13, 15, 16, 17, and 18).

The geofence 502 can comprise a center point 504 (e.g., center point (X,Y)) and a radius 506 (e.g., radius R). Although a circular geofence is shown with respect to FIG. 5, numerous other geometries are possible. As can be seen, the geofence 502 includes the entirety of four grid elements, namely, non-empty grid elements 7, 12, 13, and 17. The geofence 502 includes portions of five non-empty grid elements, namely, non-empty grid elements 6, 8, 11, 16, and 18. The geofence 502 includes portions of five empty grid elements, namely, empty grid elements 2, 3, 14, 22, and 23. Thus, the geographic area contains a total of ten non-empty grid elements. As a result, hashtable 510 contains ten keys 512 such that the ratio of keys to non-empty grid elements approaches one. Nonetheless, respective keys 512 of hashtable 510 can be associated with zero non-empty grid elements, one non-empty grid element, or more than one non-empty grid element according to various embodiments. For example, keys 0, 4, 5, and 9 store data for zero non-empty grid elements, keys 1, 2, and 3 store data for one non-empty grid elements, and keys 6, 7, and 8 store data for two non-empty grid elements.

Hashtable 510 compiles user device data from portions of non-empty grid elements overlapping the geofence 502. Thus, the hashtable 510 compiles all user device data from non-empty grid elements entirely overlapping the geofence 502 (i.e., non-empty grid elements 7, 12, 13, and 17), and the hashtable 510 compiles relevant user device data from non-empty grid elements partially overlapping the geofence 502 (i.e., non-empty grid elements 6, 8, 11, 16, and 18). Relevant user device data associated with non-empty grid elements partially overlapping a respective geofence can comprise user device data associated with user devices contained in the relevant portion of the non-empty grid element overlapping the geofence 502.

The hashtable 510 can use conditions to determine relevant user devices in non-empty grid elements partially overlapping the geofence 502. For example, the values 514 retrieved from the hashtable for non-empty grid elements partially overlapping the geofence 502 can use a conditional statement such as: for user device locations (A, B) in non-empty grid element N partially overlapping a geofence centered at (X, Y) having radius R, then true if distance (A, B) to (X, Y) is less than R, otherwise false. Further examples of these conditional statements can be seen in the values 514 of hashtable 510 corresponding to non-empty grid elements partially overlapping the geofence 502. Different conditional statements for similar or dissimilar geofence areas can be used in accordance with various embodiments of the present disclosure.

Thus, FIG. 5 illustrates an example execution of a geofence query. The geofence query can define a geofence, determine non-empty grid elements, or portions thereof, which overlap the geofence, and retrieve, from the hashtable, relevant user device data from the overlapping nonempty grid elements, or relevant portions thereof.

Figure 6:
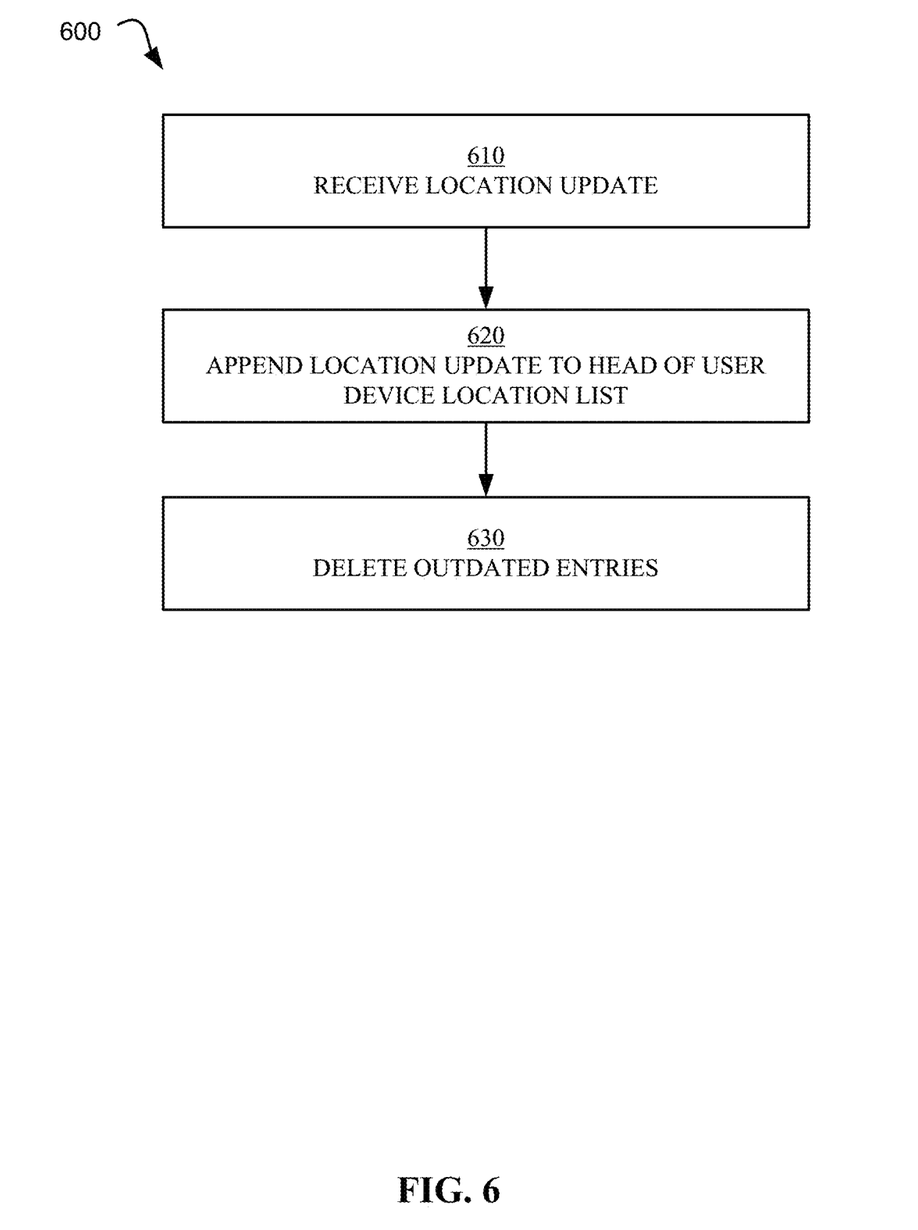
FIG. 6 illustrates a flowchart of a method for updating location data from one or more user devices in accordance with some embodiments of the present disclosure.

Referring now to FIG. 6, illustrated is a flowchart of a method for updating location data from one or more user devices in accordance with some embodiments of the present disclosure. The method 600 can be executed by one or more processors (e.g., processors 105 of FIG. 1) according to a set of instructions (e.g., instructions 160 of FIG. 1). The method 600 can begin by receiving (e.g., by a processing device 100 of FIG. 1) a location update from a respective user device in operation 610. In some embodiments, each user device communicates location updates in predetermined intervals. In operation 620, the location update can be appended to a head of a list of location updates corresponding to the respective user device. In operation 630, outdated entries can be evicted (i.e., deleted) from the list. In various embodiments, outdated entries can be identified as entries having a timestamp before the current time stamp. In alternative embodiments, outdated entries can include entries having a timestamp earlier than the current time minus a latency period. The latency period can account for delays resulting from, or associated with, an interval at which a user device communicates location updates, an upper bound of estimated clock drift, a transmission delay, and other parameters causing a delay or disruption in user device location updates. In various embodiments, an interest, or subscription, of each outdated location entry associated with a respective user device can be copied prior to deleting each outdated location entry. In alternative embodiments, an interest, or subscription, of a respective user device can be retrieved from a repository of data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing, invoicing, or otherwise receiving payment for use of the systems.

What is claimed is:

1. A method comprising:
   dividing, by a processor, a geographic area into a plurality of grid elements;
   associating, by the processor, respective location updates from respective user devices located within the geographic area to a respective grid element to create a plurality of non-empty grid elements by:
     receiving a respective location update from a respective user device;
     appending the respective location update to a head of a list associated with a location of the respective user device; and
     deleting, in response to the appending, an outdated location update from a tail of the list, wherein the outdated location update has a timestamp earlier than a current time minus a user device location update interval, minus a clock drift parameter, and minus a transmission latency parameter;
   creating, by the processor, a hashtable storing non-empty grid elements of the plurality of non-empty grid elements, wherein a first non-empty grid element comprises a set of user device data for user devices located in the first non-empty grid element;
   resizing, by the processor, the hashtable based on a total number of non-empty grid elements;
   determining, by the processor, that the first non-empty grid element overlaps a geofence in the geographic area; and
   retrieving, by the processor and from the hashtable, the set of user device data stored in the first non-empty grid element and corresponding to user devices located in the geofence.

2. The method of claim 1, wherein resizing the hashtable based on the total number of non-empty grid elements further comprises resizing the hashtable to contain a number of keys equal to the total number of non-empty grid elements.

3. The method of claim 1, wherein creating a hashtable further comprises creating a hashtable having a minimum number of keys equal to a square root of a number of grid elements in the plurality of grid elements and a maximal number of keys equal to the number of grid elements in the plurality of grid elements.

4. The method of claim 1, wherein each grid element of the plurality of grid elements is equally sized.

5. The method of claim 1, further comprising:
   sending, based on retrieving the set of user device data, a message to a user device located within the geofence.

6. A system comprising:
   a tangible memory storing instructions; and
   a processor communicatively coupled to the tangible memory and configured to perform a method comprising:
   dividing a geographic area into a plurality of grid elements;
   associating respective location updates from respective user devices located within the geographic area to a respective grid element to create a plurality of non-empty grid elements by:
     receiving a respective location update from a respective user device;
     appending the respective location update to a head of a list associated with a location of the respective user device; and
     deleting, in response to the appending, an outdated location update from a tail of the list, wherein the outdated location update has a timestamp earlier than a current time minus a user device location update interval, minus a clock drift parameter, and minus a transmission latency parameter;
   creating a hashtable storing non-empty grid elements of the plurality of non-empty grid elements, wherein a first non-empty grid element comprises a set of user device data for user devices located in the first non-empty grid element;
   resizing the hashtable based on a total number of non-empty grid elements;
   determining that the first non-empty grid element overlaps a geofence in the geographic area; and retrieving from the hashtable, the set of user device data stored in the first non-empty grid element and corresponding to user devices located in the geofence.

7. The system of claim 6, wherein resizing the hashtable based on the total number of non-empty grid elements further comprises resizing the hashtable to contain a number of keys equal to the total number of non-empty grid elements.

8. The system of claim 6, wherein creating a hashtable further comprises creating a hashtable having a minimum number of keys equal to a square root of a number of grid elements in the plurality of grid elements and a maximal number of keys equal to the number of grid elements in the plurality of grid elements.

9. The system of claim 6, wherein each grid element of the plurality of grid elements is equally sized.

10. The system of claim 6, the method further comprising:
sending, based on retrieving the set of user device data, a message to a user device located within the geofence.

11. A computer program product comprising a non-transitory computer readable storage medium having program instructions embodied therewith, the program instructions executable by a processor to cause the processor to perform a method comprising: dividing a geographic area into a plurality of grid elements; associating respective location updates from respective user devices located within the geographic area to a respective grid element to create a plurality of non-empty grid elements by: receiving a respective location update from a respective user device; appending the respective location update to a head of a list associated with a location of the respective user device; and deleting, in response to the appending, an outdated location update from a tail of the list, wherein the outdated location update has a timestamp earlier than a current time minus a user device location update interval, minus a clock drift parameter, and minus a transmission latency parameter; creating a hashtable storing non-empty grid elements of the plurality of non-empty grid elements, wherein a first non-empty grid element comprises a set of user device data for user devices located in the first non-empty grid element; resizing the hashtable based on a total number of non-empty grid elements; determining that the first non-empty grid element overlaps a geofence in the geographic area; and retrieving from the hashtable, the set of user device data stored in the first non-empty grid element and corresponding to user devices located in the geofence.

12. The computer program product of claim 11, wherein resizing the hashtable based on the total number of non-empty grid elements further comprises resizing the hashtable to contain a number of keys equal to the total number of non-empty grid elements.

13. The computer program product of claim 11, wherein creating a hashtable further comprises creating a hashtable having a minimum number of keys equal to a square root of a number of grid elements in the plurality of grid elements and a maximal number of keys equal to the number of grid elements in the plurality of grid elements.

14. The computer program product of claim 11, wherein each grid element of the plurality of grid elements is equally sized.

15. The computer program product of claim 11, the method further comprising:
sending, based on retrieving the set of user device data, a message to a user device located within the geofence.

* * * * *